United States Patent
Hennecken

(10) Patent No.: US 7,019,930 B1
(45) Date of Patent: Mar. 28, 2006

(54) DIGITAL FILTERING AND DIGITAL AUTOMATIC GAIN CONTROL FOR A VARIABLE SPEED READ CHANNEL

(75) Inventor: Mark Hennecken, Parker, CO (US)

(73) Assignee: Storage Technology Corporation, Louisville, CO (US)

(*) Notice: Subject to any disclaimer, the term of this patent is extended or adjusted under 35 U.S.C. 154(b) by 295 days.

(21) Appl. No.: 10/244,294

(22) Filed: Sep. 16, 2002

(51) Int. Cl.
 *G11B 5/03* (2006.01)
 *G11B 5/09* (2006.01)

(52) U.S. Cl. ............... 360/66; 360/46; 360/51; 360/48

(58) Field of Classification Search ............ 360/46, 360/66, 65, 48, 51, 75; 714/15
See application file for complete search history.

(56) References Cited

U.S. PATENT DOCUMENTS

| | | | |
|---|---|---|---|
| 4,366,471 A | 12/1982 | Kasuga | 340/347 DA |
| 4,502,021 A | 2/1985 | Hill et al. | 330/279 |
| 5,138,601 A * | 8/1992 | Shimizume | 369/59.21 |
| 5,384,671 A | 1/1995 | Fisher | 360/51 |
| 5,544,178 A | 8/1996 | Zook | 371/43 |
| 5,734,680 A | 3/1998 | Moore et al. | 375/263 |
| 5,909,331 A * | 6/1999 | Behrens et al. | 360/51 |
| 6,195,133 B1 | 2/2001 | Bae | 348/678 |
| 6,304,400 B1 | 10/2001 | Schneider | 360/65 |
| 6,313,962 B1 | 11/2001 | Galbraith et al. | 360/46 |
| 6,404,829 B1 * | 6/2002 | Sonu | 375/345 |
| 6,470,474 B1 * | 10/2002 | Fredrickson et al. | 714/794 |

* cited by examiner

*Primary Examiner*—David Hudspeth
*Assistant Examiner*—Glenda Rodriguez
(74) *Attorney, Agent, or Firm*—Yee & Associates P.C.

(57) ABSTRACT

A method and system are disclosed for providing a variable speed digital read channel. The read channel includes an analog portion and a digital portion. The read channel includes an analog-to-digital converter (ADC) for converting an analog read signal into a sampled read signal. The ADC is synchronized to a sample clock. The sample clock has a variable clock rate. The digital portion includes a digital filter for reducing noise. The digital filter can be implemented as a low pass filter (LPF), a high pass filter (HPF), or a bandpass filter (BPF). The filter receives the sampled read signal from the ADC. The digital filter is synchronized to the sample clock. The digital filter's cutoff frequencies adjust automatically as the variable clock rate is changed, and does not require reprogramming. The digital portion may also include a digital automatic gain control device.

23 Claims, 4 Drawing Sheets

DIGITAL FILTERING AND DIGITAL AUTOMATIC GAIN CONTROL FOR A VARIABLE SPEED READ CHANNEL

BACKGROUND OF THE INVENTION

1. Field of the Invention

The present invention relates to a storage device that includes a digital read channel including digital filtering and digital automatic gain control devices, where the digital read channel is coupled to a variable speed storage device.

2. Background of the Invention

Magnetic tape is effectively used to store digital data. Data is written onto the magnetic tape by a write head. The write head converts a current signal containing the digital information into flux patterns which are written as field transitions onto the magnetic tape. The data is retrieved when the magnetic tape is passed by a read head. The read head passes over the magnetic medium and transduces the magnetic transitions into pulses in an analog read signal, which are then decoded by read channel circuitry to reproduce the digital sequence.

Decoding the pulses into a digital sequence can be performed by a simple pulse detector read channel or, as in more recent designs, by a partial response maximum likelihood (PRML) read channel. The PRML read channel scheme is preferred over the simpler pulse detection scheme because it decreases the necessary bandwidth, thereby allowing more data to be stored on the storage medium.

FIG. 1 is a block diagram of a PRML read channel 100 in accordance with the prior art. PRML read channel 100 receives an electronic signal from a read head 102. Read head 102 is included in a storage device, such as a disk drive or tape drive, and is used to retrieve data stored using the device. The storage device may be capable of operating at a variable speed. Thus, PRML read channel 100 must receive a variable rate clock 104 as an input.

PRML read channel 100 includes an analog portion 106 and a digital portion 108. An analog-to-digital converter (ADC) 110 receives an output from the analog portion 106, converts the output to a digital data sample signal, and provides the digital data sample signal to digital portion 108.

Analog portion 106 includes a preamplifier 112, an analog low pass filter 114 and an automatic gain control (AGC) circuit 116. Read head 102 outputs an analog read signal that is received by preamplifier 112 which amplifies the signal. Next, the amplified signal is input into analog low pass filter 114 which is used to filter noise content from the signal. The filtered signal is then input into AGC 116. The output of AGC 116 is provided as an input to ADC 110.

The output of ADC 110 is provided to a pulse shaping filter 118, typically implemented as a finite impulse response filter (FIR). The output of pulse shaping filter 118 is provided as an input to Viterbi detector 120.

Because the storage device is capable of operating at a variable speed, a programming line 122 is used to program analog low pass filter 114 and AGC 116 so that analog low pass filter 114 and AGC 116 will operate at each of the variable speeds. The analog filter and AGC are programmed so that they are optimized for the data transfer rate of the input signal. Thus, when the data transfer rate changes, the analog filter and AGC must be reprogrammed.

The variable speed operation of the device will change the frequencies over which filter 114 and AGC 116 must operate. As the range of clock rates increases, the range of programmability must increase. This increases the complexity, difficulty, and cost of analog low pass filter 114 and of AGC 116.

Another solution to providing filtering and gain control over a wide range of frequencies is to provide multiple filters and AGC circuits that must be switched in and out of the read channel. This will also increase the cost of the read channel.

SUMMARY OF THE INVENTION

A method and system are disclosed for providing a variable speed digital read channel. The read channel includes an analog portion and a digital portion. The read channel includes an analog-to-digital converter (ADC) for converting an analog read signal into a sampled read signal. The ADC is synchronized to a sample clock. The sample clock has a variable clock rate. The digital portion includes a digital filter for reducing noise. The digital filter can be implemented as a low pass filter (LPF), a high pass filter (HPF), or a bandpass filter (BPF). The filter receives the sampled read signal from the ADC. The digital filter is synchronized to the sample clock. The digital filter's cutoff frequencies adjust automatically as the variable clock rate is changed, and does not require reprogramming as is required by an analog filter. The digital portion may also include a digital automatic gain control device.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention provides a digital PRML read channel in a variable speed magnetic tape drive. The read channel includes a digital filter in the PRML channel. This reduces or eliminates the need for an analog low pass filter. The digital filter may be implemented utilizing a low pass filter (LPF), a high pass filter (HPF), or a bandpass filter (BPF).

Figure 1:
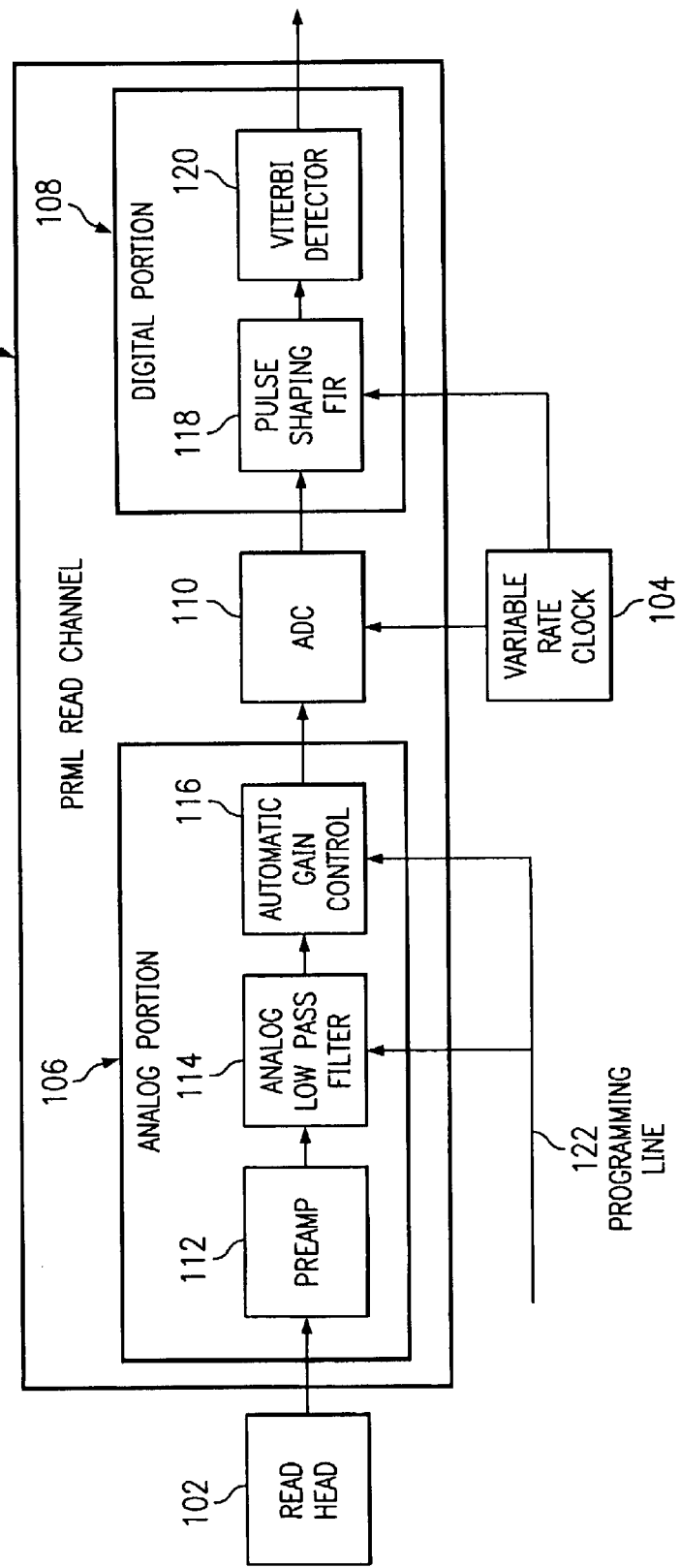
FIG. 1 is a block diagram of a read channel in accordance with the prior art.
Figure 2:
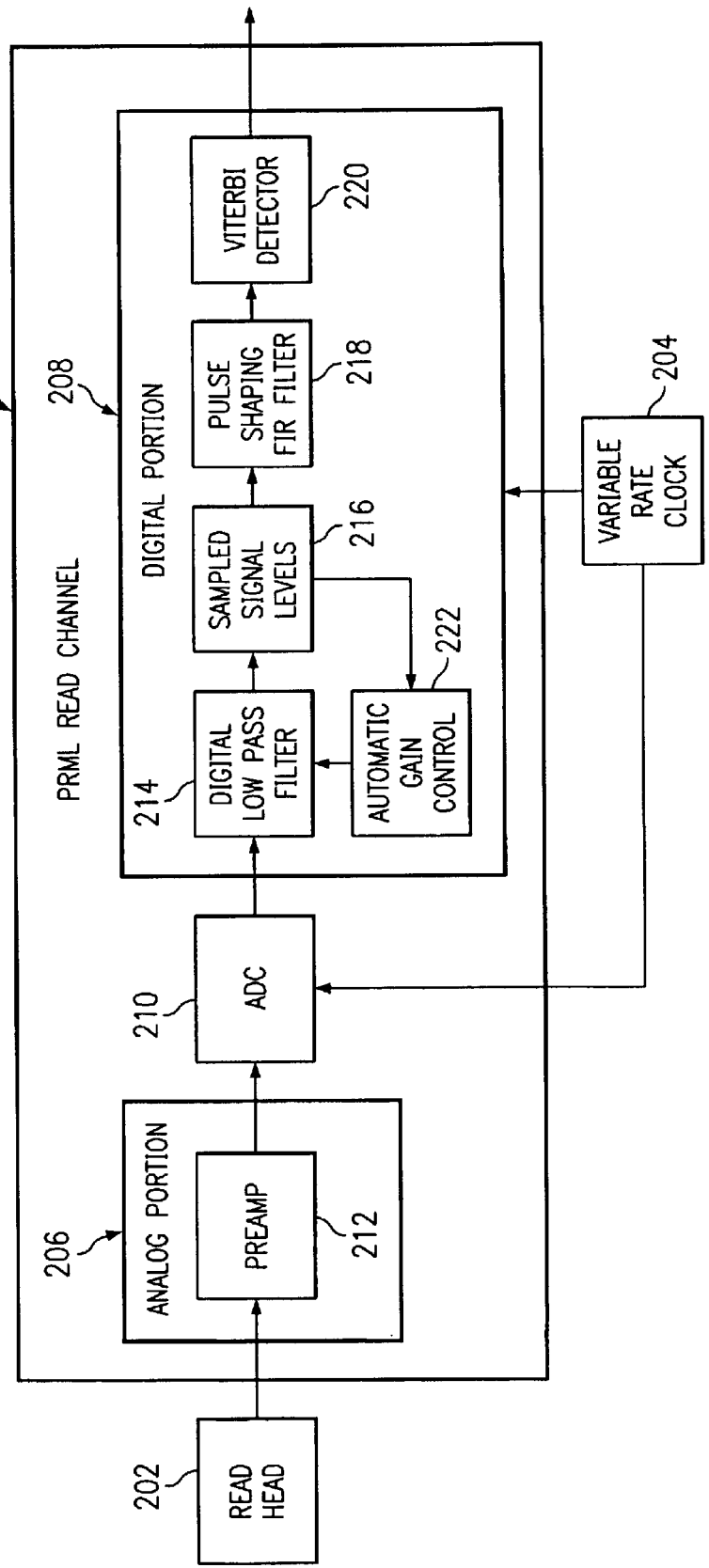
FIG. 2 is a block diagram of a first embodiment of a read channel that includes a digital filter that adjusts automatically as a variable rate sample clock changes in accordance with the present invention.

FIG. 2 is a block diagram of a first embodiment of a read channel 200 that includes a digital filter that adjusts automatically as a variable rate sample clock changes in accordance with the present invention. PRML read channel 200 receives an electronic signal from a read head 202. Read head 202 is included in a storage device, such as a disk drive or tape drive, and is used to retrieve data stored using the device. The storage device is capable of operating at a variable speed. Thus, PRML read channel 200 must receive a variable rate clock 204 as an input.

PRML read channel 200 includes an analog portion 206 and a digital portion 208. An analog-to-digital converter (ADC) 210 receives an output from the analog portion 206, converts the output to a digital data sample signal, and provides the digital data sample signal to digital portion 208. Analog portion 206 includes a preamplifier 212.

Read head 202 outputs an analog read signal that is received by preamplifier 212 which amplifies the signal. Next, the amplified signal is input into ADC 210 which is subjected to sampling and quantization within ADC 210 which, when synchronized to variable rate clock 204, generates raw digital data samples as the output of ADC 210. The digital signal output from ADC 210 is then input into digital portion 208.

Digital portion 208 includes a digital filter 214, preferably implemented as a finite impulse response (FIR) filter, for filtering noise from the received digital signal. Digital FIR 214 receives and filters the signal output from ADC 210. FIR 214 then outputs a sampled signal levels signal 216. Signal 216 is received within a digital pulse shaping FIR filter 218 which shapes the received signal and generates a shaped signal output. The shaped signal is then received by a detector, preferably implemented as a Viterbi detector 220. Viterbi detector 220 detects the digital sequence from the sampled data input into the detector based upon the Viterbi maximum likelihood algorithm.

A digital automatic gain control device 220 receives the sampled signal levels signal 216, generates a gain control signal, and provides the gain control signal as an input into digital FIR 214. Automatic gain control(AGC) 222 generates its gain control values from the conditioned data samples included in sample signal levels signal 216 output by the digital FIR filter 214. AGC 222 provides its output as an input into digital 214. Alternatively, AGC 222 could instead provide its output as an input into pulse shaping FIR 218.

AGC 222 is a digital device. As with filtering, the automatic gain control function has traditionally been done in the analog domain. However, as with filtering, the time constants associated with the AGC control need to change as the tape speed changes. The digital AGC adjust automatically as the rate of variable rate clock 204 is changed.

ADC 210 and digital portion 208 receive and are synchronized to variable rate clock 204. Digital FIR filter 214 employs a single set of filter coefficients for filtering and conditioning the input data samples in order to produce filtered and conditioned output data samples. The coefficients do not change in response to a change in the rate of variable rate clock 204. The coefficients can be reprogrammed to change the desired conditioning, but do not change as a result of the variable rate clock.

By providing a digital filter 214, an analog low pass filter is not required, but may still be used. Digital filter 214 adjusts automatically as the rate of variable rate clock 204 is changed. The analog LPF required reprogramming of the cutoff as the rate changed. The digital filter does not require reprogramming since the coefficients used do not change. This makes the operation of the filter automatic and seamless. The digital filter adds little or no cost to implement since the read channel is already digital and the digital filter is a very tiny and very simple function to add. In addition, the digital filter does not suffer from the tolerance problems inherent in making a programmable analog filter. Thus, the spectral response of a digitized signal produced when passed through an FIR, is the same from device to device, whereas the spectral response produced when an analog LPF is used will vary considerably from device to device.

Figure 3:
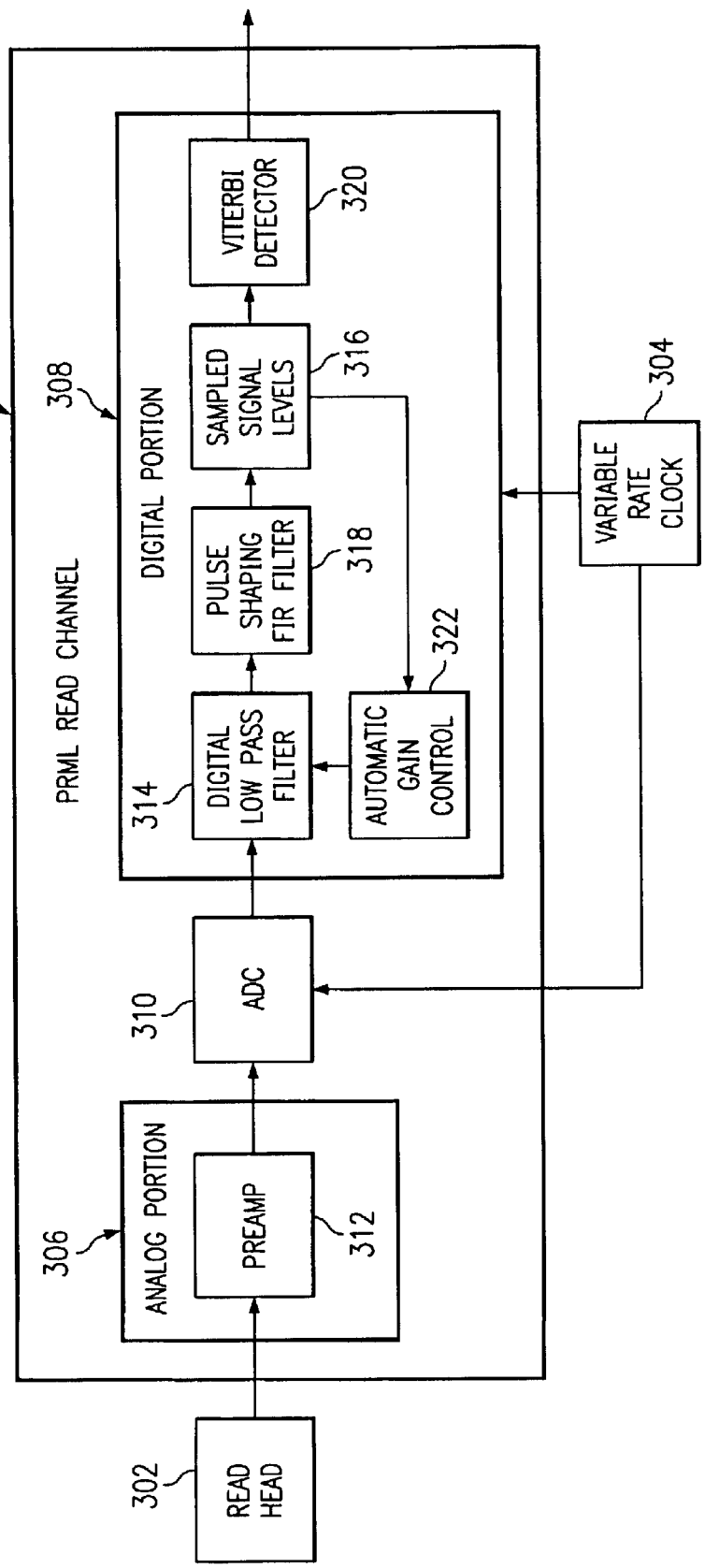
FIG. 3 is block diagram of a second embodiment of a read channel that includes a digital filter that adjusts automatically as a variable rate sample clock changes in accordance with the present invention.

FIG. 3 is block diagram of a second embodiment of a read channel that includes a digital filter that adjusts automatically as a variable rate sample clock changes in accordance with the present invention. PRML read channel 300 receives an electronic signal from a read head 302. Read head 302 is included in a storage device, such as a disk drive or tape drive, and is used to retrieve data stored using the device. The storage device is capable of operating at a variable speed. Thus, PRML read channel 300 must receive a variable rate clock 304 as an input.

PRML read channel 300 includes an analog portion 306 and a digital portion 308. An analog-to-digital converter (ADC) 310 receives an output from the analog portion 306, converts the output to a digital data sample signal, and provides the digital data sample signal to digital portion 308. Analog portion 306 includes a preamplifier 312.

Read head 302 outputs an analog read signal that is received by preamplifier 312 which amplifies the signal. Next, the amplified signal is input into ADC 310 which converts the analog signal to a digital signal of data samples. This digital signal is then input into digital portion 308.

Digital portion 308 includes a digital filter 314, preferably implemented as a finite impulse response (FIR) filter, for filtering noise from the received digital signal. FIR 314 outputs a signal that is input into a PRML digital pulse shaping FIR filter 318. Pulse shaping FIR filter 318 generates a sampled signal levels signal 316. Signal 316 is received within by a detector, preferably implemented as a Viterbi detector 320.

A digital automatic gain control device 322 receives the sampled signal levels signal 316, generates a gain control signal, and provides the gain control signal as an input into digital FIR 314. Automatic gain control 322 generates its gain control values from the conditioned data samples included in sample signal levels signal 316 output by the digital pulse shaping FIR filter 318. AGC 322 provides its output as an input into digital filter 314. Alternatively, AGC 322 could instead provide its output as an input into pulse shaping FIR 318. ADC 310 and digital portion 308 receive and are synchronized to variable rate clock 304.

Figure 4:
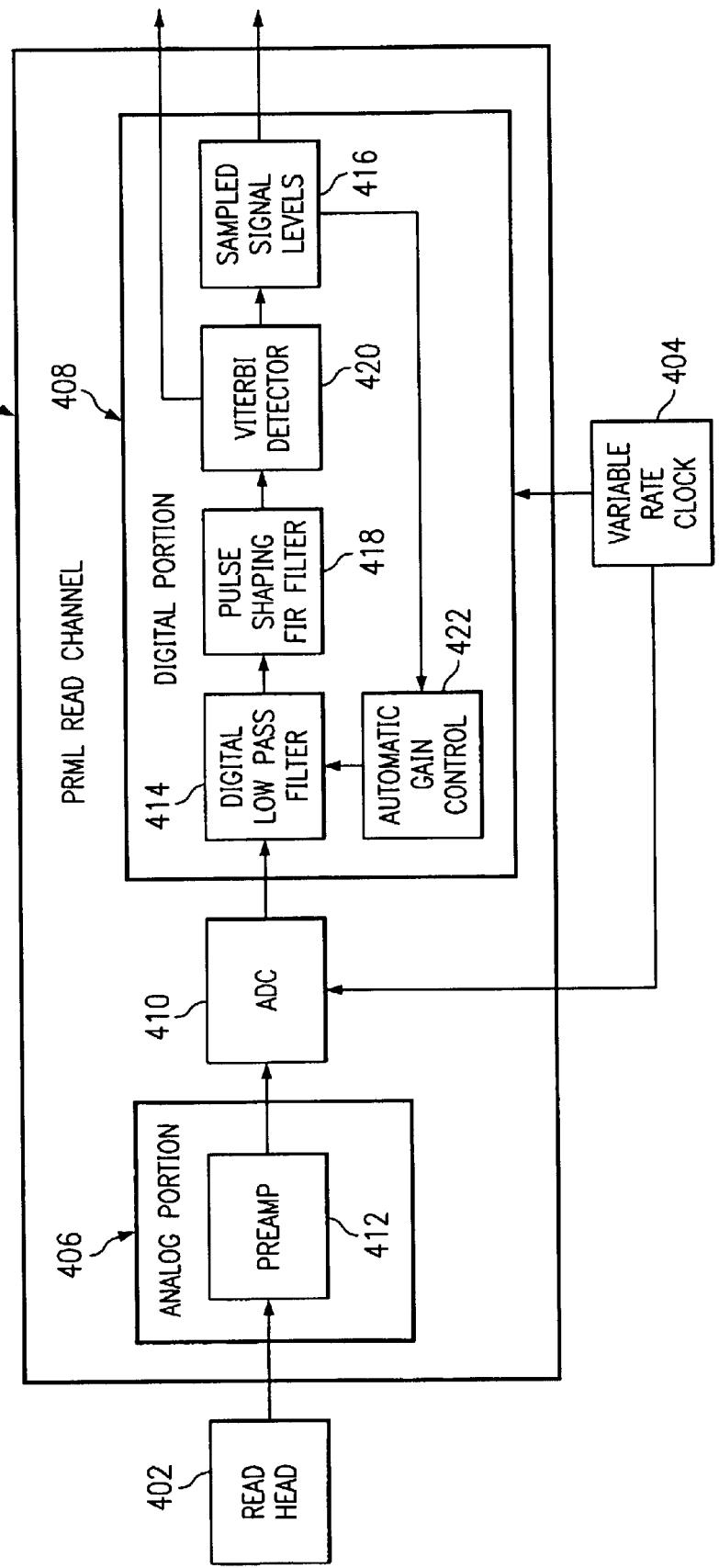
FIG. 4 is block diagram of a third embodiment of a read channel that includes a digital filter that adjusts automatically as a variable rate sample clock changes in accordance with the present invention.

FIG. 4 is block diagram of a third embodiment of a read channel that includes a digital filter that adjusts automatically as a variable rate sample clock changes in accordance with the present invention. PRML read channel 400 receives an electronic signal from a read head 402. Read head 402 is included in a storage device, such as a disk drive or tape drive, and is used to retrieve data stored using the device. The storage device is capable of operating at a variable speed. Thus, PRML read channel 400 must receive a variable rate clock 404 as an input.

PRML read channel 400 includes an analog portion 406 and a digital portion 408. An analog-to-digital converter (ADC) 410 receives an output from the analog portion 406, converts the output to a digital data sample signal, and provides the digital data sample signal to digital portion 408. Analog portion 406 includes a preamplifier 412.

Read head 402 outputs an analog read signal that is received by preamplifier 412 which amplifies the signal. Next, the amplified signal is input into ADC 410 which converts the analog signal to a digital signal of data samples. This digital signal is then input into digital portion 408.

Digital portion 408 includes a digital filter 414, preferably implemented as a finite impulse response (FIR) filter, for filtering noise from the received digital signal. FIR 414 outputs a signal that is received within a digital pulse shaping FIR filter 418 which shapes the received signal and generates a shaped signal output. The shaped signal is then received by a detector, preferably implemented as a Viterbi detector 420. Viterbi detector 420 outputs a sampled signal levels signal 416.

A digital automatic gain control device 420 receives the sampled signal levels signal 416, generates a gain control signal, and provides the gain control signal as an input into digital FIR 414. Automatic gain control 422 generates its gain control values from the conditioned data samples included in sample signal levels signal 416 output by the Viterbi detector 420. AGC 422 provides its output as an input into digital filter 414. Alternatively, AGC 422 could instead provide its output as an input into pulse shaping FIR 418. ADC 410 and digital portion 408 receive and are synchronized to variable rate clock 404.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A read channel for reading magnetic data stored on a variable speed storage drive, comprising:
   said read channel being connected to a read head that is included in said variable speed storage drive;
   said read channel including an analog portion and a digital coupled together utilizing an analog-to-digital converter (ADC);
   said analog portion for receiving from said read head an input variable speed analog electronic data signal as its input and producing as its output an output analog signal, said analog portion not including an analog filter;
   said ADC receiving said output analog signal as its input and producing an output digital signal as its output;
   said digital portion including:
   a digital filter receiving as an input said output digital signal and producing as its output a filtered signal, said digital filter including a single set of filter coefficients that remain unchanged in response to a change in a rate of a variable rate clock;
   said variable rate clock being input into said digital filter;
   a digital decoding device being coupled to said digital filter, said decoding device including a pulse shaping filter coupled to a Viterbi detector;
   said digital decoding device receiving as its input said filtered signal; and
   said digital filter automatically adjusting to track a rate of said variable rate clock which automatically adjusts to track a rate of said variable speed analog electronic data signal.

2. The read channel according to claim 1, wherein said digital filter is a low pass filter.

3. The read channel according to claim 1, wherein said digital filter is a high pass filter.

4. The read channel according to claim 1, wherein said digital filter is a band pass filter.

5. The read channel according to claim 1, further comprising:
   said digital filter having a cutoff frequency, said cutoff frequency being determined by said rate of said variable rate clock;
   said rate of said variable rate clock being changed from a first rate to a second rate;
   said cutoff frequency of said digital filter being changed from a first cutoff to a second cutoff when said rate of said variable rate clock changes from said first rate to said second rate; and
   wherein said read channel is automatically self-adjusting such that said channel tracks with said rate of said variable rate clock.

6. A read channel for reading magnetic data stored on a variable speed storage drive, comprising:
   said read channel being connected to a read head that is included in said variable speed storage drive;
   said read channel including an analog portion and a digital portion coupled together utilizing an analog-to-digital converter (ADC);
   said analog portion for receiving from said read head a variable speed analog read signal as its input and producing as its output an output analog signal, said analog portion not including an analog filter;
   said analog-to-digital converter (ADC) for converting said output analog signal to a sampled read signal, said ADC being synchronized to a sample clock;
   said sample clock having a variable clock rate; and
   said digital portion including digital devices, said digital portion including:
   a digital filter for reducing noise, said digital filter receiving said sampled read signal from said ADC, said digital filter being synchronized to said sample clock, wherein said digital filter adjusts automatically as said variable clock rate is changed which automatically adjusts to track a rate of said variable speed analog electronic data signal, said digital filter including a single set of filter coefficients that remain unchanged in response to a change in said rate of said variable rate clock.

7. The read channel according to claim 6, wherein said digital filter is a low pass filter.

8. The read channel according to claim 6, wherein said digital filter is a high pass filter.

9. The read channel according to claim 6, wherein said digital filter is a band pass filter.

10. The read channel according to claim 6, further comprising:
    said read channel being a Partial Response Maximum Likelihood (PRML) read channel.

11. The read channel according to claim 6, further comprising:
    said digital portion including a digital pulse shaping filter and a digital detector;
    said digital filter being coupled to said digital pulse shaping filter, said digital filtering generating a filter signal, wherein said pulse shaping filter receives said filtered signal as it input; and said pulse shaping filter generating a shaped signal, said pulse shaping filter being coupled to said digital detector for receiving and decoding said shaped signal.

12. The read channel according to claim 11, further comprising:
    said pulse shaping filter being a digital finite impulse response (FIR) filter; and
    said detector being a Viterbi detector that utilizes a Viterbi maximum likelihood algorithm.

13. The read channel according to claim 6, further comprising:
    said analog portion including a preamplifier.

14. The read channel according to claim 6, further comprising:
    a digital automatic gain control (AGC) circuit being included in said digital portion, said digital AGC generating a gain control signal; and
    said digital ACG automatically adjusting said gain control signal synchronously with said sample clock, wherein said digital AGC adjusts automatically as said variable clock rate is changed.

15. The read channel according to claim 14, further comprising:
    said digital filter generating a filtered signal;
    said digital ACG circuit receiving said filtered signal as its input; and
    said ACG providing said gain control signal to said digital filter.

16. The read channel according to claim 6, further comprising:
    said digital portion including a digital pulse shaping filter and a digital detector;
    said digital filter being coupled to said digital pulse shaping filter, said digital filter generating a filtered signal, wherein said pulse shaping filter receives said filtered signal as its input;
    said pulse shaping filter generating a shaped signal, said pulse shaping filter being coupled to said digital detector for receiving and decoding said shaped signal;
    a digital automatic gain control (AGC) circuit being included in said digital portion, said digital AGC generating a gain control signal;
    said digital AGC automatically adjusting said gain control signal synchronously with said sample clock, wherein said digital AGC adjusts automatically as said variable clock rate is changed;
    said digital AGC circuit receiving said shaped signal as its input; and
    said AGC providing said gain control signal to said digital filter.

17. The read channel according to claim 6, further comprising:
    said digital portion including a digital pulse shaping filter and a digital detector;
    said digital filter being coupled to said digital pulse shaping filter, said digital filter generating a filtered signal, wherein said pulse shaping filter receives said filtered signal as its input;
    said pulse shaping filter generating a shaped signal, said pulse shaping filter being coupled to said digital detector for receiving and decoding said shaped signal, said digital detector generating a decoding signal as its output;
    a digital automated gain control (AGC) circuit being included in said digital portion, said digital AGC generating a gain control signal;
    said digital AGC automatically adjusting said gain control signal synchronously with said sample clock, wherein said digital AGC adjusts automatically as said variable clock rate is changed;
    said digital AGC circuit receiving said decoded signal as its input; and
    said AGC providing said gain control signal to said digital filter.

18. The read channel according to claim 6, further comprising:
    said digital portion including a digital pulse shaping filter and a digital detector;
    said digital filter being coupled to said digital pulse shaping filter, said digital filter generating a filtered signal, wherein said pulse shaping filter receives said filtered signal as its input;
    said pulse shaping filter generating a shaped signal, said pulse shaping filter being coupled to said digital detector for receiving and decoding said shaped signal, said digital detector generating a decoding signal as its output;
    a digital automated gain control (AGC) circuit being included in said digital portion, said digital AGC generating a gain control signal;
    said digital AGC automatically adjusting said gain control signal synchronously with said sample clock, wherein said digital AGC adjusts automatically as said variable clock rate is changed;
    said digital AGC circuit receiving said decoded signal as its input; and
    said AGC providing said gain control signal to said digital pulse shaping filter.

19. The read channel according to claim 6, further comprising:
    said digital portion including a digital pulse shaping filter and a digital detector;
    said digital filter being coupled to said digital pulse shaping filter, said digital filter generating a filtered signal, wherein said pulse shaping filter receives said filtered signal as its input;
    said pulse shaping filter generating a shaped signal, said pulse shaping filter being coupled to said digital detector for receiving and decoding said shaped signal, said digital detector generating a decoding signal as its output;
    a digital automated gain control (AGC) circuit being included in said digital portion, said digital AGC generating a gain control signal;
    said digital AGC automatically adjusting said gain control signal synchronously with said sample clock, wherein said digital AGC adjusts automatically as said variable clock rate is changed;
    said digital AGC circuit receiving said shaped signal as its input; and
    said AGC providing said gain control signal to said digital pulse shaping filter.

20. A method for reading magnetic data stored on a variable speed storage drive, said method comprising the steps of:
    a read channel being connected to a read head that is included in said variable speed storage drive;
    said read channel including an analog portion and a digital portion coupled together utilizing an analog-to-digital converter (ADC);

receiving an input variable speed analog electronic data signal within said analog portion from said read head and producing an output analog signal, said analog portion not including an analog filter;

receiving said output analog signal within said ADC and producing an output digital signal;

said digital portion including a digital filter, a variable rate clock, and a decoding device;

receiving, by said digital filter, as an input said output digital signal and producing as its output a filtered signal;

inputting said variable rate clock into said digital filter;

coupling said decoding device to said digital filter, said decoding device including a pulse-shaping filter coupled to a Viterbi detector;

receiving within said decoding device said filtered signal; and automatically adjusting said digital filter to track a rate of said variable rate clock which automatically adjusts to track a rate of said input variable speed analog electronic data signal, said digital filter including a single set of filter coefficients that remain unchanged in response to a change in said rate of said variable rate clock.

21. The method according to claim 20, wherein said digital filter is a low pass filter.

22. The method according to claim 20, wherein said digital filter is a high pass filter.

23. The method according to claim 20, wherein said digital filter is a band pass filter.

* * * * *